US010320970B2

(12) United States Patent
Cao et al.

(10) Patent No.: US 10,320,970 B2
(45) Date of Patent: Jun. 11, 2019

(54) SYSTEM AND METHOD FOR ANOMALY DETECTION FOR NON-HOMOGENOUS ARRIVAL RATE

(71) Applicant: Nokia of America Corporation, Murry Hill, NJ (US)

(72) Inventors: Jin Cao, Berkeley Heights, NJ (US); Sining Chen, Bedminster, NJ (US); Jeffery J. Spiess, Denton, TX (US); Alasdhair R. Campbell

(73) Assignee: NOKIA OF AMERICA CORPORATION, Murray Hill, NJ (US)

( * ) Notice: Subject to any disclaimer, the term of this patent is extended or adjusted under 35 U.S.C. 154(b) by 0 days.

(21) Appl. No.: 15/690,953

(22) Filed: Aug. 30, 2017

(65) Prior Publication Data

US 2018/0091649 A1    Mar. 29, 2018

Related U.S. Application Data

(60) Provisional application No. 62/400,900, filed on Sep. 28, 2016.

(51) Int. Cl.
| | |
|---|---|
| *H04M 3/51* | (2006.01) |
| *G06F 17/18* | (2006.01) |
| *H04M 3/36* | (2006.01) |
| *G06F 7/556* | (2006.01) |

(52) U.S. Cl.
CPC .............. *H04M 3/36* (2013.01); *G06F 7/556* (2013.01); *G06F 17/18* (2013.01); *H04M 3/5175* (2013.01)

(58) Field of Classification Search
CPC ......... H04M 3/5175; H04M 2203/401; H04M 2203/402; H04M 3/5238; H04M 3/51
USPC ............ 379/265.03, 265.05, 265.07, 266.08, 379/265.06, 265.01, 265.08, 266.07
See application file for complete search history.

(56) References Cited

U.S. PATENT DOCUMENTS

| | | | | |
|---|---|---|---|---|
| 5,872,918 | A * | 2/1999 | Malomsoky ......... | H04Q 3/0062 709/220 |
| 2010/0042726 | A1* | 2/2010 | Luzon .................... | G06Q 10/06 709/226 |

OTHER PUBLICATIONS

Bila et al. "Intuitive Network Applications: Learning User Context and Behavior," Bell Labs Technical Journal, 13, No. 2 (2008), DOI: 10.1002/bltj.

(Continued)

*Primary Examiner* — Thjuan K Addy
(74) *Attorney, Agent, or Firm* — Harness, Dickey & Pierce, P.L.C.

(57) ABSTRACT

The method includes receiving a plurality of calls from users of the communication network, the plurality of calls having a non-homogenous arrival rate that is defined by first arrival rate information, transforming the first arrival rate information into second arrival rate information, the second arrival rate information having a homogenous arrival rate, and detecting at least one first anomaly of the received plurality of calls using the second arrival rate information. A network node may be configured to perform this method.

16 Claims, 6 Drawing Sheets

(56) References Cited

OTHER PUBLICATIONS

Cao et al. "Monitoring Time-Varying Network Streams Using State-Space Models," IEEE INFOCOM 2009 Proceedings.
Jiang et al., "Weighted CUSUM Control Charts for Monitoring Inhomogeneous Poisson Processes with Varying Sample Sizes", Journal of Quality Technology, 43(4), Apr. 8, 2011.
Purdy et al., "Surveillance of Non-Homogeneous Poisson Processes", Technometrics, Nov. 14, 2014.

* cited by examiner

SYSTEM AND METHOD FOR ANOMALY DETECTION FOR NON-HOMOGENOUS ARRIVAL RATE

PRIORITY STATEMENT

This application is a non-provisional application that claims priority to provisional U.S. application No. 62/400,900 filed on Sep. 28, 2016, the entire contents of which is incorporated herein by reference.

BACKGROUND OF THE INVENTION

Field of Invention

Example embodiments relate generally to a system and a method for detecting anomalies from events that have a non-homogenous arrival rate.

Related Art

A counting process may be implemented to detecting anomalies in a counting process, such as a counting of incoming calls at a customer care center. During normal conditions, the counting process may have a time varying expected arrival rate, which may be considered as an example of a non-homogenous Poisson process. Within such a non-homogenous Poisson process, an anomaly may be a deviation from an expected arrival rate.

Existing methods may be based on fixed time windows, where time may be divided into equally sized windows and monitored for an aggregate count of events in within the windows. In particular, one conventional approach uses a pair of control charts, where one of the charts may be used to monitor for change, and the other chart may be used to monitor for an end of change. However, this approach may include several disadvantages, for at least a couple of reasons: 1) the method may not work well with counting processes with sparse arrivals, and 2) the method may assume that the rate is constant. An example of this type of approach has been disclosed in the following document: Bila, Nihon, Cao, Dinoff, Ho, Kumar, Liewen and Santos, "Intuitive network applications: Learning user context and behavior," Bell Labs Technical Journal, 13, No. 2 (2008), p. 31-47.

Another conventional approach uses measurements made at fixed time windows (e.g. KPIs in each 15 minute window). Although this approach may accommodate time varying rates, this approach may have several disadvantages, including: 1) the method does not work well for very low rates, and 2) the method may not be a streaming algorithm (i.e., it does not provide a response with each arrival, but rather waits until the end of each time window). An example of this type of approach has been disclosed in the following document: Cao, Chen, Bu, Buvaneswari, "Monitoring Time-Varying Network Streams Using State-Space Models," INFOCOM (2009), IEEE, p. 2721-2725.

SUMMARY OF INVENTION

At least one example embodiment relates to a method of anomaly detection for a communication network.

In one embodiment, the method of anomaly detection for a communication network includes, receiving, by at least one first processor of at least one first network node, a plurality of calls from users of the communication network, the plurality of calls having a non-homogenous arrival rate that is defined by first arrival rate information; transforming, by the at least one first processor, the first arrival rate information into second arrival rate information, the second arrival rate information having a homogenous arrival rate; and detecting, by the at least one first processor, at least one first anomaly of the received plurality of calls using the second arrival rate information.

In one embodiment, the first arrival rate information is a non-homogenous Poisson process where the received plurality of calls are represented on non-constant time-scale, and the second arrival rate information is a homogenous Poisson process where the received plurality of calls are represented on constant time-scale.

In one embodiment, the transforming further includes, warping the first arrival rate information in order to represent the received plurality of calls on a stationary time-scale.

In one embodiment, the detecting further includes, identifying at least one first change in the second arrival rate information, the at least one first change being the at least one first anomaly, In one embodiment, the detecting further includes, monitoring an initial set of calls, of the received plurality of calls, over a first period of time, calculating an average number of incoming calls based on the initial set of calls, determining a first set of cumulative sum (CUSUM) parameters for the at least one first network node, based on the initial set of calls and the average number of incoming calls, determining at least one first arrival rate threshold, based on the first set of CUSUM parameters.

In one embodiment, the detecting further includes, comparing the at least one first threshold to the second arrival rate information in order to detect the at least one first anomaly.

In one embodiment, the transforming and the detecting steps are performed each time a call, of the plurality of calls, is received.

In one embodiment, the transforming and the detecting steps are not performed at fixed time increments.

At least another example embodiment includes a network node.

In one embodiment, a network node includes, a memory storing computer readable instructions; at least one first processor configured to execute the computer readable instructions such that the at least one first processor is configured to, receive a plurality of calls from users of the communication network, the plurality of calls having a non-homogenous arrival rate that is defined by first arrival rate information; transform the first arrival rate information into second arrival rate information, the second arrival rate information having a homogenous arrival rate; and detect at least one first anomaly of the received plurality of calls using the second arrival rate information.

In one embodiment, the first arrival rate information is a non-homogenous Poisson process where the received plurality of calls are represented on non-constant time-scale, and the second arrival rate information is a homogenous Poisson process where the received plurality of calls are represented on constant time-scale.

In one embodiment, the at least one first processor performs the transforming by being configured to, warp the first arrival rate information in order to represent the received plurality of calls on a stationary time-scale.

In one embodiment, the at least one first processor performs the detecting by being configured to, identify at least one first change in the second arrival rate information, the at least one first change being the at least one first anomaly.

In one embodiment, the at least one first processor further performs the detecting by being configured to, monitor an initial set of calls, of the received plurality of calls, over a first period of time, calculate an average number of incoming calls based on the initial set of calls, determine a first set of cumulative sum (CUSUM) parameters for the at least one first network node, based on the initial set of calls and the average number of incoming calls, determine at least one first arrival rate threshold, based on the first set of CUSUM parameters.

In one embodiment, the at least one first processor is further configured to detect by being configured to, compare the at least one first threshold to the second arrival rate information in order to detect the at least one first anomaly.

In one embodiment, the at least one first processor is further configured to perform the transforming and detecting each time a call, of the plurality of calls, is received.

In one embodiment, the at least one first processor is further configured to perform the transforming and the detecting steps without the steps being performed at fixed time increments.

DETAILED DESCRIPTION

Figure 1:
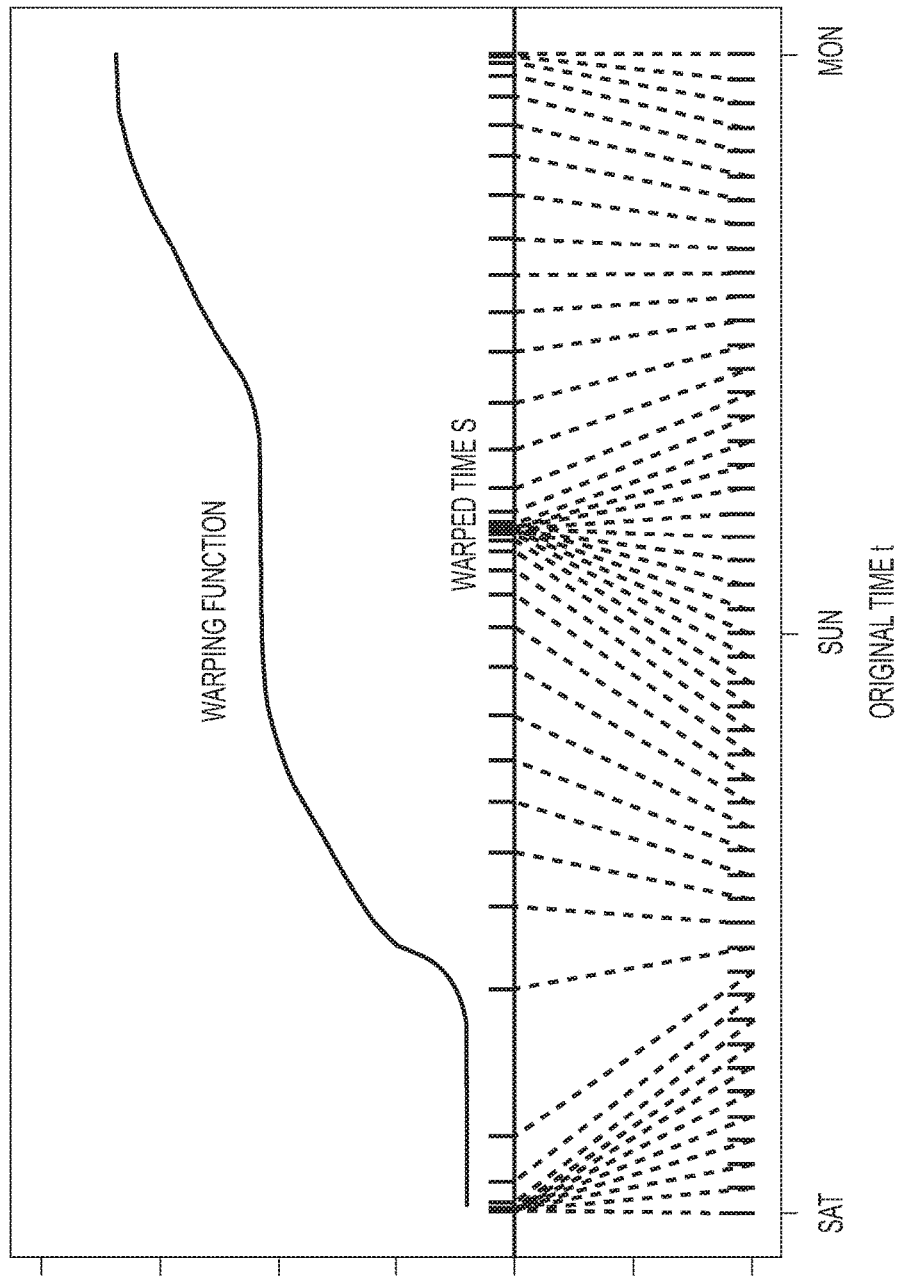
FIG. 1 illustrates an example of a time warping transformation that transforms a NHPP into an HPP through a nonlinear transformation through a warping function that is defined by the cumulative arrival rate $L(.)$, in accordance with an example embodiment.

While example embodiments are capable of various modifications and alternative forms, embodiments thereof are shown by way of example in the drawings and will herein be described in detail. It should be understood, however, that there is no intent to limit example embodiments to the particular forms disclosed, but on the contrary, example embodiments are to cover all modifications, equivalents, and alternatives falling within the scope of the claims. Like numbers refer to like elements throughout the description of the figures.

Before discussing example embodiments in more detail, it is noted that some example embodiments are described as processes or methods depicted as flowcharts. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

Methods discussed below, some of which are illustrated by the flow charts, may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium such as a storage medium, such as a non-transitory storage medium. A processor(s) may perform the necessary tasks.

Specific structural and functional details disclosed herein are merely representative for purposes of describing example embodiments. This invention may, however, be embodied in many alternate forms and should not be construed as limited to only the embodiments set forth herein.

It will be understood that, although the terms first, second, etc, may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

It should also be noted that in some alternative implementations, the functions/acts noted may occur out of the order noted in the figures. For example, two figures shown in succession may in fact be executed concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Portions of the example embodiments and corresponding detailed description are presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

In the following description, illustrative embodiments will be described with reference to acts and symbolic representations of operations (e.g., in the form of flowcharts) that may be implemented as program modules or functional processes include routines, programs, objects, components, data structures, etc., that perform particular tasks or implement particular abstract data types and may be implemented using existing hardware at existing network elements. Such existing hardware may include one or more Central Processing Units (CPUs), digital signal processors (DSPs), application-specific-integrated-circuits, field programmable gate arrays (FPGAs) computers or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" of "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the example embodiments are typically encoded on some form of program storage medium or implemented over some type of transmission medium. The program storage medium may be any non-transitory storage medium such as magnetic, optical, or flash memory, etc. Similarly, the transmission medium may be twisted wire pairs, coaxial cable, optical fiber, or some other suitable transmission medium known to the art. The example embodiments not limited by these aspects of any given implementation.

General Methodology:

Example embodiments may include a system and a method for detecting anomalies from events that have a non-homogenous arrival rate. Embodiments may also include an algorithm to detect the anomalies in a counting process, such as a counting process that involves counting incoming calls to a customer care center. The counting process may have a time varying expected arrival rate, which may be considered a non-homogenous Poisson process. An "anomaly" within this process may be a deviation from an expected arrival rate. The anomalies may be evaluated in a streaming fashion, as each event occurs, as opposed to evaluating the anomalies at an end of a fixed time window.

The method may act during inter-arrival times, such as between adjacent events (e.g. incoming calls), instead of being based on aggregated counts during a time window. General steps of the process may include the following: 1) transforming a function (which may be referred to as "time warping") in order to transform a non-homogenous process into a homogenous process; and 2) modifying a cumulative sum (CUSUM) control chart algorithm adapted to streaming set up for anomaly detection (including the use of a "timer" to detect the end of an increased rate). When multiple processes with different baseline rates may be monitored in parallel, the method may automatically select and alternative rate for each baseline rate. A threshold for start and end of change may be elicited through a number of alarms (and, false alarms) that may be it obtained through simulations.

The modified CUSUM control chart algorithm may provide two distinct advantages: 1) the algorithm may update existing binned counts-based algorithms for streaming scenarios, so the algorithm may act on each incoming event (where this may work naturally with streaming-based architecture, in particular, and may be computationally efficient, as no computation may be needed when there are no calls), and 2) the algorithm may generalize existing algorithms in order to accommodate non-homogenous arrival rates.

It should be understood that "anomaly" detection may assist network operators of a communication network, in order to facilitate fast detection of issues which may be impacting network customers/users, such as network outages and service issues. The network operator may then be able to proactively address these issues, and provide a fast and efficient resolution to problems that may be impacting multiple end users. The end result may provide improved customer satisfaction and a more reliable service at a reduce costs to the call center and field technician dispatches.

Specific Example Embodiments:

Example embodiments may provide a complete solution for solving a problem of monitoring a number of non-homogeneous Poisson processes (NHPP). The solution may be divided into several parts. First, the NHPP may be transformed to a homogeneous Poisson process (HPP), using a "time-warping" transformation. Second, a streaming algorithm may be used to detect a rate change in the HPP, in order to monitor any stream of a counting process for an "anomaly." Third, the method may automatically select alternative hypotheses to simultaneously monitor multiple HPPs, with differing arrival rates. Fourth, thresholds may be applied to the streaming algorithm and the automatic selection of alternative hypotheses, in order to make the example embodiments more efficient and effective.

Time-Warping:

The Poisson process N(t) may be signified, as follows.

$$N(t+h)-N(t) \sim \text{Poisson}(L(t+h)-L(t)) \quad \text{(Eq. 1)}$$

Where a cumulative rate may be denoted by $L(t)$, where $t$ may denote a unit of time.

In an embodiment, anomalies may be monitored in order to detect when the cumulative rate has deviated from $L(t)$. However, this monitoring may be challenging in scenarios where $N(t)$ may be non-homogeneous, as both a mean and a variance of an NHPP may vary over a period of time. Meanwhile, statistical properties of a HPP may be more tractable.

An NHPP $N(t)$ of cumulative rate $L(t)$ may be converted to a HPP $M(s)$ of constant rate $r_0$ by using the "time-warping" transformation, shown as follows:

$$s = g(t) = \frac{L(t)}{r_0} \quad \text{(Eq. 2)}$$

If a Poisson process $N(t)$ satisfies $N(t+h)-N(t) \sim \text{Poisson}(L(t+h)-L(t))$, then the same process $$s = g(t) = \frac{L(t)}{r_0}$$

resulting in $M(s+u)-M(s) \sim \text{Poisson}(r_0 \cdot u)$ may be determined.

Proof: $M(s) = N(g^{-1}(s)) = N(L^{-1}(s \cdot r_0))$ (Eq. 3)

$M(s+u) - M(s) = N(L^{-1}((s+u) \cdot r_0)) - N(L^{-1}(s \cdot r_0)) \sim$
$\quad\quad\quad\quad \text{Poisson}(L(L^{-1}((s+u) \cdot r_0)) - L(L^{-1}(s \cdot r_0)))$
$\quad\quad\quad\quad = \text{Poisson}((s+u) \cdot r_0 - s \cdot r_0)$
$\quad\quad\quad\quad = \text{Poisson}(r_0 \cdot u)$ FIG. 1 illustrates an example "time warping" transformation that may transform an NHPP into a HPP, through a nonlinear transformation through a warping function that may be defined by the cumulative arrival rate L(.). When applied, L(t) may be estimated from historic data.

Streaming CUSUM Control Chart for Monitoring M(s)

An inter-arrival time may be denoted as $a_1$, where this time may be the inter-arrival time between the i-th and i+1-th arrival in an HPP M(s). Under normal condition, a baseline model $H_0$ may hold true, where the inter-arrival times may follow an exponential distribution with rate $r_0$. Anomalies may be defined by an anomaly model $H_1$, where the inter-arrival times follow an exponential distribution of rate $r_1$. Use of a cumulative sum (CUSUM) control chart framework may be relied upon to detect the anomalies. A CUSUM chart may use a CUSUM statistic, in order to track cumulative statistical evidence of a hypothesis that the process is anomalous ($H_1$), against a hypothesis that it is normal ($H_0$), using the expressions below.

Baseline model $H_0$: $a_i \sim \text{Exp}(r_0)$

Anomaly model $H_1$: $a_i \sim \text{Exp}(r_1)$, $r_1 > r_0$ (Eq. 4)

In this setting, two CUSUM statistics may be utilized to track both the start and the end of the anomaly. In detecting an end of the anomaly, when $r_1 > r_0$, a "timer" may be used to track the end of change, in order to minimize delay, using the algorithm below.

Algorithm 1:
1) Compute the log—likelihood ratio statistic $l_i = \log r_1 - \log r_0 - (r_1 - r_0) a_i$ (Eq. 5)

2) The CUSUM statistic for the start of change is $S_1 = 0$ $S_i = \max(S_{i-1} + l_i, 0)$ (Eq. 6)

If $S_1$ exceeds a threshed $R_s$, raise an alert. Find the previous closest time point when $S_1 = 0$ and mark that as-start of the abnormal period, if not, repeat 2)

3) Once start of change has been found, turn off $S_i$, initialize $D_i = 0$.

Meanwhile, start a timer set for $A = \dfrac{R_D}{r_1 - r_0}$ for a pre-selected threshold $R_D$ (Eq. 7)

4) If time A has elapsed without another call coming: Stop the alert turn on $S_i$, initiate $S_i$ by 0, go back to 2)
If another call came in after time $a_1 < A$.

$D_i = \max(D_{i-1} - l_1, 0)$ (Eq. 8)

reset timer for $A = \dfrac{R_D - D_i}{r_1 - r_0}$ (Eq. 9)

Repeat 4) until timer expires.

Note that the $r_1 > r_0$ constraint may necessitate use of a "timer". If $r_1 < r_0$ (i.e. for monitoring a decrease in arrival rate), then use of a "timer" for monitoring $S_i$ may be used instead.

Figure 2:
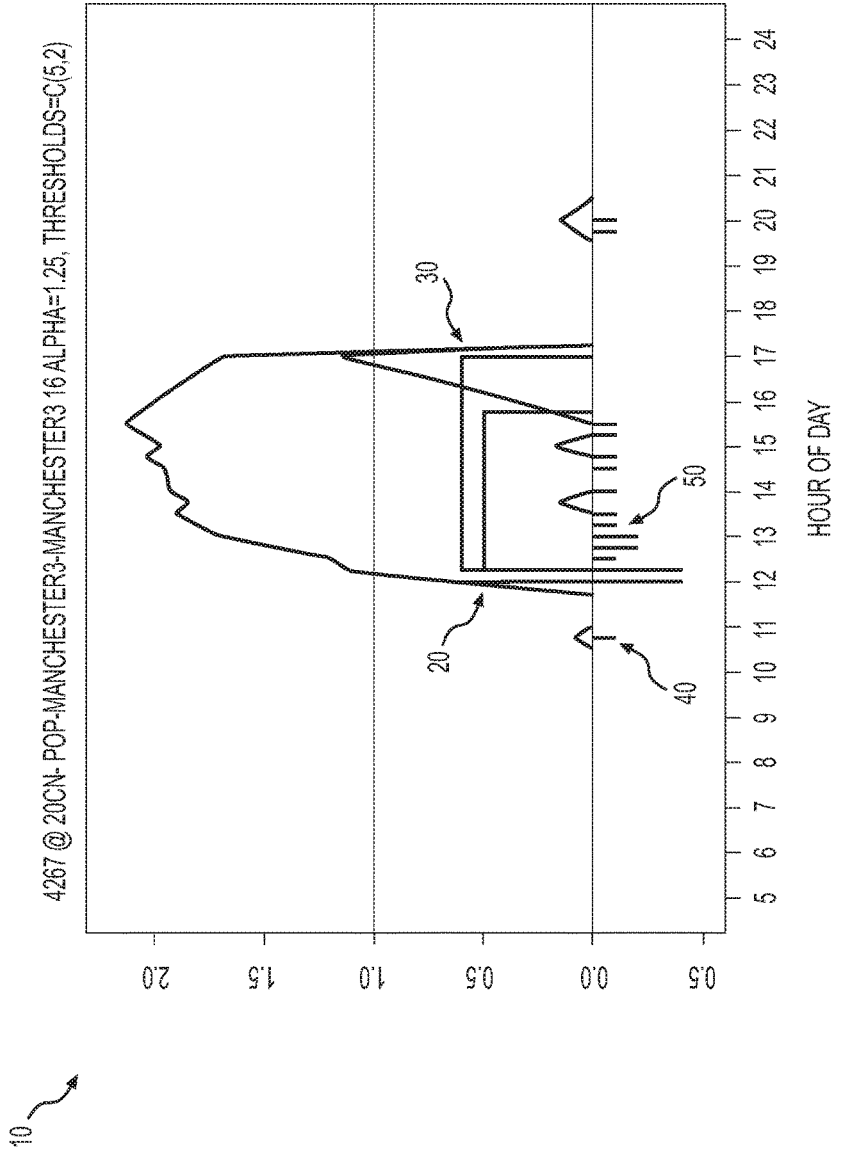
FIG. 2 illustrates an example process for determining a cumulative sum (CUSUM) statistics in accordance with an aspect of the disclosure, in accordance with an example embodiment.

FIG. 2 illustrates an example process using two CUSUM statistics for tracking the change. As shown in FIG. 2, a number of incoming events 10 (e.g., calls to a call center) may be tracked as a function of customer call arrivals, where the first CUSUM statistic ($S_i$) 20 may represent the start of change, and the second CUSUM statistic ($D_i$) 30 may represent the end of change. A first set of pulse marks 40 may represent the start and end of the actual change, where the second set of pulse marks 50 may represent the detection time of the two CUSUM statistics. Equivalent Alternative Hypotheses for Multiple Processes (Determining $r_1$):

When monitoring multiple processes of different rates, for example different network elements in a same communication network, what constitutes a "reasonable" or "detectable" anomaly may differ from process to process. In other words, by detecting a change from $r_0$ to $r_1$ within time delay T, then in a same duration of time, a proportionally smaller change may be detected from a higher baseline rate $r_0^*$ ($r_0^* > r_0$) to $r_1^*$, where $\dfrac{r_1^*}{r_0^*} < \dfrac{r_1}{r_0},$ or a proportionally larger change from a lower baseline rate $r_0^{}$ ($r_0^{} < r_0$) to $r_1^{}$, where $\dfrac{r_1^{}}{r_0^{**}} > \dfrac{r_1}{r_0}.$ A mechanism to find this "reasonable" alternative rate for each baseline rate may be represented, as follows.

$H_0$: $\lambda = r_0$ vs. $H_1$: $\lambda = r_1$ (Eq. 10)

Where $r_1$ may be determined for each $r_0$, such that when $H_1$ is true, the evidence of $H_1$ against $H_0$ (expected log likelihood ratio) over a day is the same (K is the expected number of calls in a day). In other words, this concept may be represented as follows.

$E[llr(r_0, r_1, K) | \lambda = r_1] =$ (Eq. 11)
$\quad E[K(\log r_1 - \log r_0) - (r_1 - r_0) | \lambda = r_1] =$
$\quad\quad [r_1(\log r_1 - \log r_0) - (r_1 - r_0)] = \text{const}$ After pre-specifying a pair of ($r_{0a}$, $R_{1a}$), the rest of the ($r_0$, $r_1$) pairs may be determined, by solving the following for $r_1$.

$[r_1(\log r_1 - \log r_0) - (r_1 - r_0)] - [r_{1a}(\log r_{1a} - \log r_{0a}) - (r_{1a} - r_{0a})] = 0$ (Eq. 12)

Figure 3:
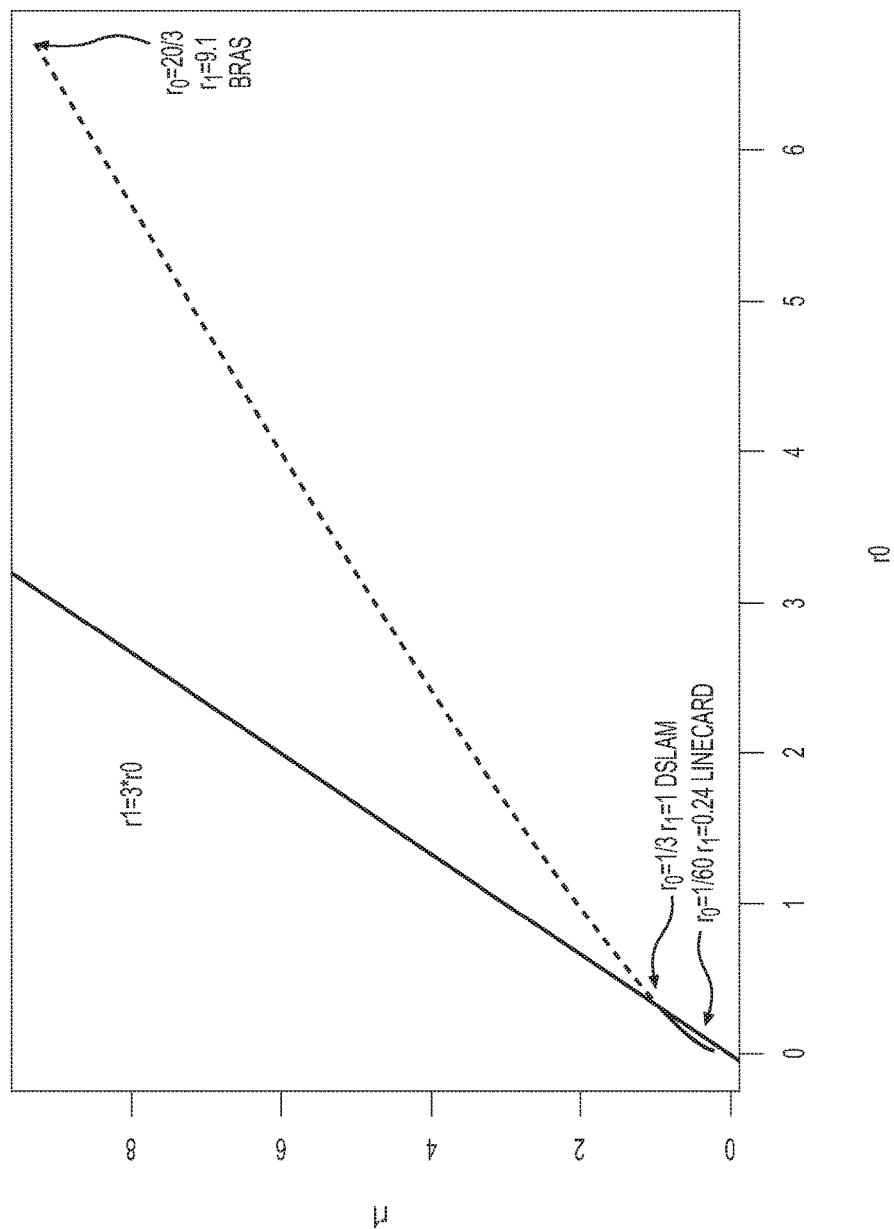
FIG. 3 illustrates an example of calculating $(r_0, r_1)$ pairs in accordance with an aspect of the disclosure, in accordance with an example embodiment.

FIG. 3 illustrates the above example of ($r_0$, $r_1$) pairs being determined using the above mechanism, where it may be pre-specified that: ($r_{0a} = \frac{1}{3}$, $r_{1a} = 1$). It shall be noted that the deviation of the solution is from r1=3*r0.

Figure 4:
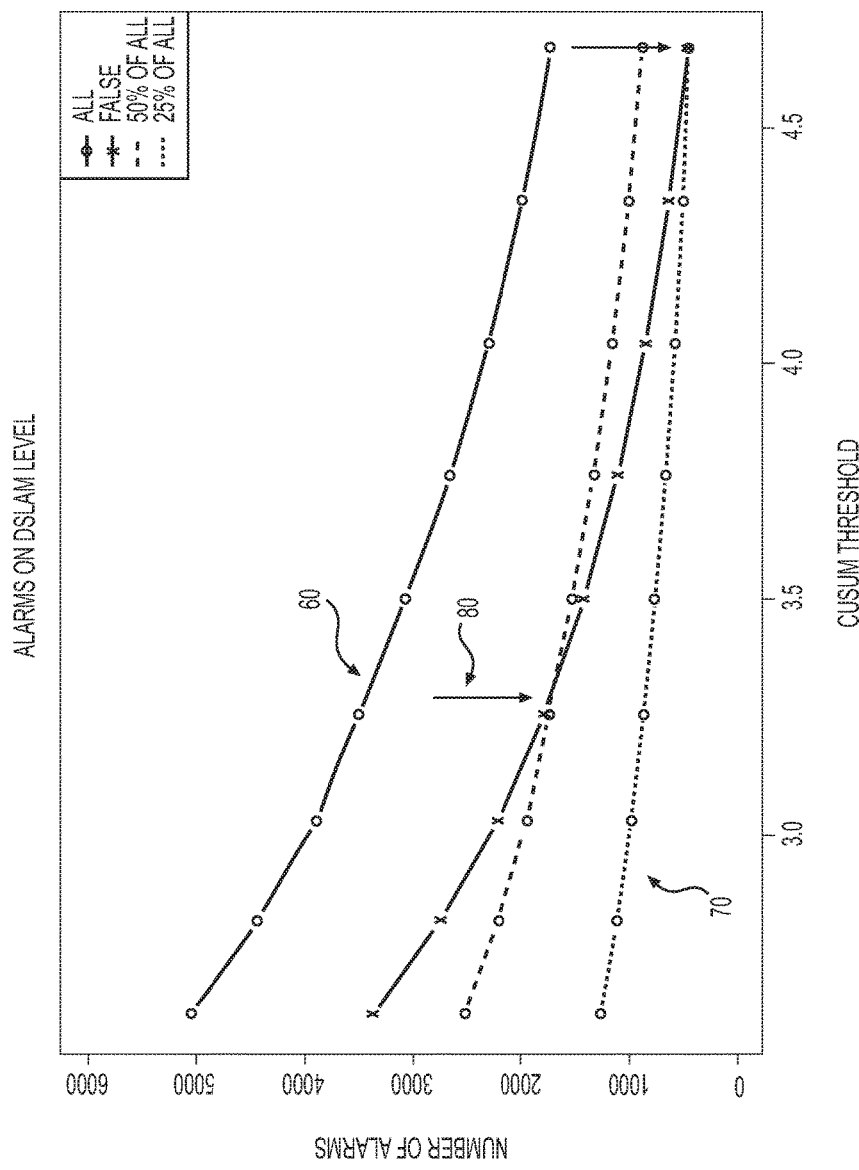
FIG. 4 illustrates CUMSUM thresholds using selectable false discovery rates, in accordance with an example embodiment.

Eliciting Threshold $R_s$:

Thresholds may be elicited by asking a network operator to choose a desired number of discovered events within an entire communication system, in terms of an expected average number of calls for a duration of time (that may be a time span of a day, a week, or a month, as an example). An associated false discovery rate may be given. This may be done by running training data through a sequence of thresholds while counting a number of alerts that may be raised using the thresholds 60 (see the thresholds 60 shown in FIG. 4). A numerical search or interpolation for an efficient threshold to achieve a user-specified number of events may be used. A false alarm rate may be calculated by simulating event arrivals from a baseline model and counting a number of (false) alarms 70 that may be raised. For example, if a network operator expects 3500 events (e.g., alarms) in a month 80, this frequency may correspond to a threshold of $R_s=3.25$, and a false alarm rate of 50%.

Figure 5:
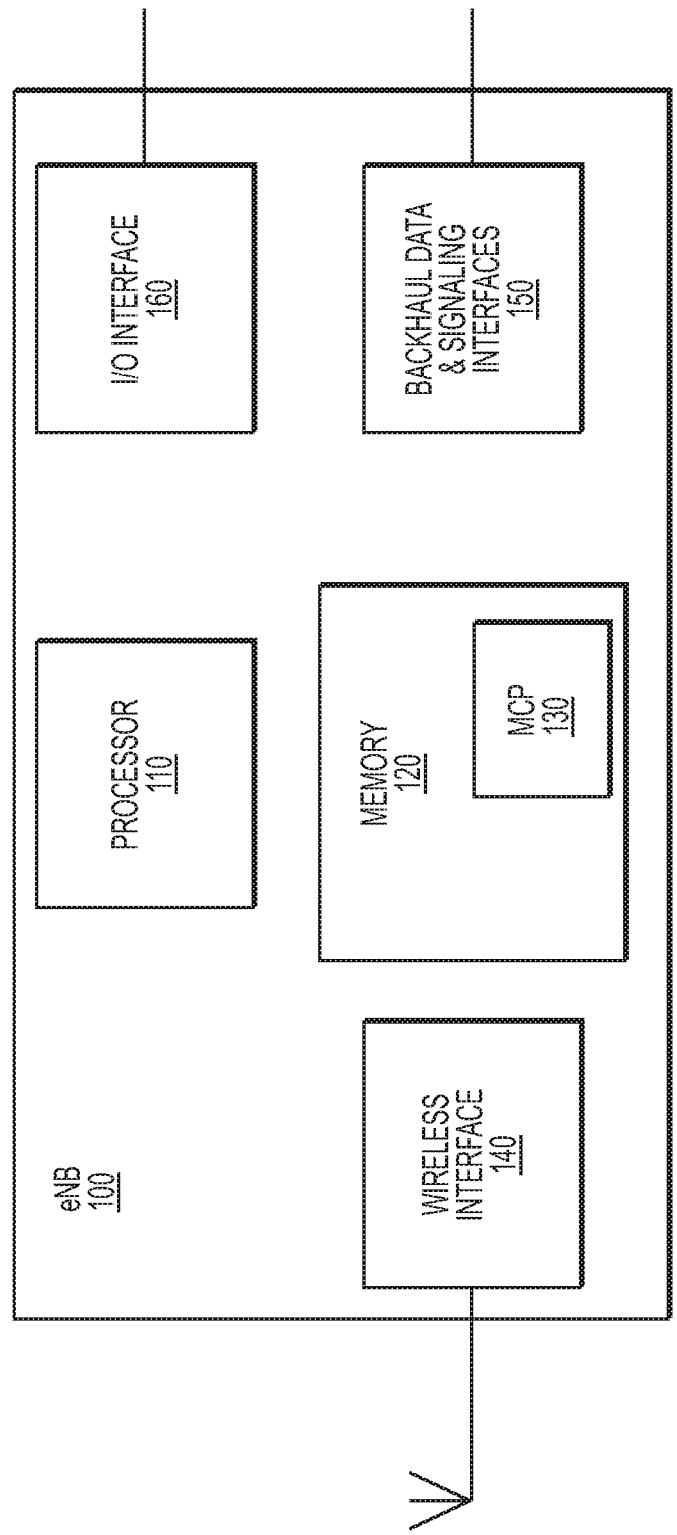
FIG. 5 illustrates a network node, in accordance with an example embodiment.

Specific Example Embodiment:

FIG. 5 illustrates a network node 100, which may be a network "edge" node, for performing the method steps (described in the flowchart shown in FIG. 6) of the example embodiments. The network node 100 may be any node or server within a communication. For instance, the node 100 may be an evolved universal terrestrial radio access network (E-UTRAN) Node B (eNB) 100. Or alternatively the node 100 may be a network central office, a dedicated stand-alone server, a user equipment, etc. The network node 100 may also be a part of an existing node, a server, a digital subscriber line access multiplexer (I)SLAM), or a broadband remote access server (BRAS) with a line card, where the node 100 may be modified to include the structural components described herein.

The network node 100 may be controlled by a processor 100, where the processor 100 may either exist within the node 100, or be a separate entity (i.e., node) that may be physically detached from the node 100. The processor 110 may control the functions of the node 100, such that the processor 110 may cause the node 100 to perform the method steps described in relation to FIG. 6 (described below). The processor 110 may consist of one or more core processing units, either physically coupled together or distributed.

The node 100 may also include: a memory 120; a wireless communication interface 140; and a backhaul interface 150. The processor 110 may be operatively coupled to the memory 120 and the interfaces 140/150. The functions performed by the processor 110 may be implemented using hardware. Such hardware may include one or more central processing units (CPUs), digital signal processors (DSPs), application-specific-integrated-circuits, field programmable gate arrays (FPGAs) computers or the like. The term processor, used throughout this document, may refer to any of these example implementations, though the term is not limited to these examples. With a Virtual Radio Access Network (VRAN) architecture various functions eNB components may be distributed across multiple processing circuits and multiple physical nodes within a VRAN cloud. Although illustrated in a single block, in other embodiments the node 100 may also be implemented using parallel and distributed architectures. Furthermore, various steps may be executed using one or more nodes 100 sequentially, in parallel, or in a different order based on particular implementations. That is to say, other nodes 100 may be communicatively interconnected using the interfaces 140/150, such that more than one node 100 may be utilized to perform the steps of the example embodiments.

The memory 120 may include instructions, which may be saved in the memory, where the instructions may be a memory counting process (MCP) routine 130. The instructions of the MCP 130 may cause the processor 110 to perform the method steps described in FIG. 6, below. The memory 120 may be any type or combination of memory suitable for storing and accessing electronic information, such as, for example, transitory random access memory (RAM) or non-transitory memory such as read only memory (ROM), hard disk drive memory, database memory, compact disk drive memory, optical memory, etc.

The node 100 may also include one or more peripheral input/output interfaces 160, which may be operated under the control of the processor 110, and may be configured to input data into or output data from the node 100, such as, for example, network adapters, data ports, USB ports, and various user interface devices such as a keyboard, a keypad, a mouse, or a display panel.

While a particular embodiment of the node 100 is illustrated in FIG. 5, various aspects in accordance with the example embodiments may also be implemented using one or more application specific integrated circuits (ASICs), field programmable gate arrays (FPGAs), or any other combination of dedicated or programmable hardware.

Figure 6:
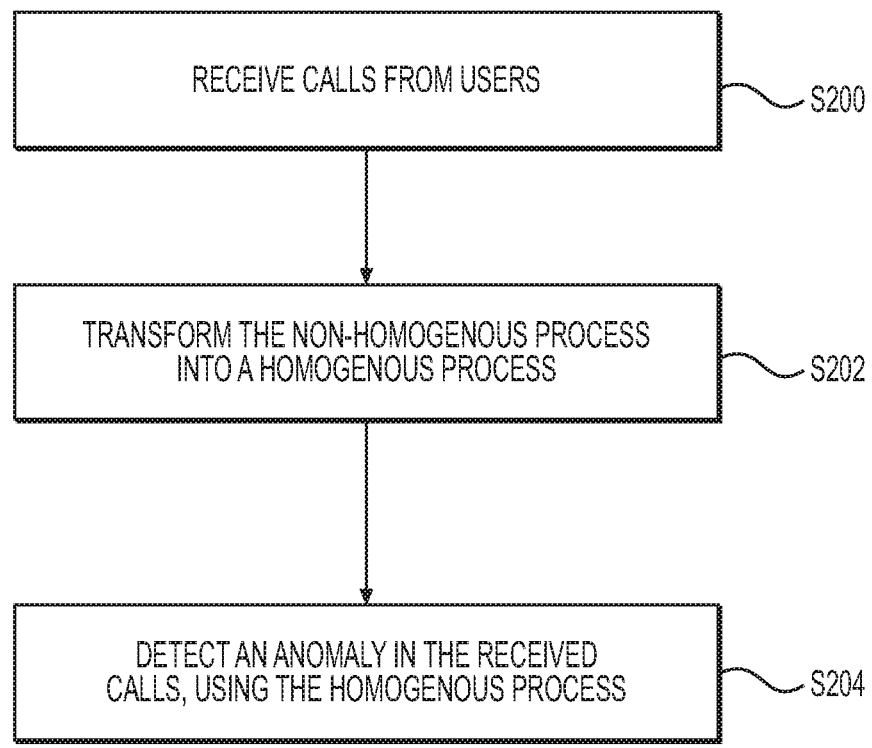
FIG. 6 illustrates a flowchart including method steps for monitoring a non-homogenous counting process, in accordance with an example embodiment.

FIG. 6 illustrates a flowchart including method steps for monitoring a non-homogenous counting process, in accordance with an example embodiment. The method may be used for anomaly detection of call center tickets in a streaming setup operated by a network provider, where the call center may field network user calls for a telecommunication network. It is assumed in this example that 1) each call to the call center reaches the node 100 (FIG. 5) at a time that the call is made; and 2) each call is associated with topology information (i.e., each call may be attributed to several network nodes), based on call trace information.

In step S200 of FIG. 6, the processor 110 of the network node 100 may begin to receive and/or detect a series of calls from users of a communication network. These incoming calls may be considered to be a non-homogenous process, as defined above. In step S202, the processor 110 may transform the non-homogenous process into a homogenous process, using "time-warping" (as described in the "Time-Warping" section of this document). In step S204, the processor 110 may cause the node 100 to detect an anomaly related to the received calls. This may be accomplished by using the modified CUSUM control chart algorithm. A "timer" may be used to detect an end of an increased rate (i.e., the end of the anomaly).

In an embodiment, in step S204 the processor 110 may use one or more "thresholds" to identify the start and end of rate changes. To that end, the arrival rate for a node 100 (which may be referred to as "node i," may be denoted as $l_i(t)$, where this rate may be understood to depend on two quantities: 1) a weekly pattern for an entire network, or "network rate", (e.g., which may be implemented as a vector of length 674 corresponding to a time of week, in 15 minute intervals); and 2) a multiplier for node i (refereed to herein as "node multipliers"). To determine the arrival rate, there may be a "training period" and a "running period" for node i.

During the "training period," the network rate and the node multipliers may be trained and updated weekly, for an extended period of time, where this period of time may be, for example, at least one month. The CUSUM parameters "r0" and "r1" for each node may be looked up by node multiplier, from a pre-calculated table. The CUSUM parameters may be used to initialize the "running period." it should be understood that the CUSUM parameters may be updated weekly (between Saturday night and Sunday morning, for instance), during the running period, in order to ensure that the anomaly detection will accommodate recent changes in the network, and in individual nodes.

At the end of the training period, thresholds may be determined based on a desired number of discovered events (which may be determined based on previous empirical data, or may be determined based on operator input) that may be expected on an average day. An associated false discovery rate may be given. This may be done by running the training data through a sequence of thresholds, and counting a number of alerts that may be raised using those thresholds. Then, a numerical search or interpolation for an optimized threshold, which may achieve an operator-specified number of events, may be accomplished. The number of events, and the false discovery rates, may also be assigned to a "level." In an embodiment, the threshold may be the same across all nodes and levels, as a default threshold. In another embodiment, different levels may have a different expected number of events, based on an assigned level, which may be determined or selected based on network operator input.

During the "running" period, a CUSUM statistic for each existing node i may be calculated and tracked in a streaming fashion, as the calls are received. To that end, a state vector may be implemented for each node. The state vector may be updated with each relevant new call, though the vector may not grow with time. If a new node is added to the network, the new node may get its own state vector. A real-time list of alerts may be maintained for all ongoing anomalies, where each alert contains the information regarding a detected anomaly such as the start time, the detected time, and the expected end time of the anomaly. The list may be updated when another call on the same node is received prior to a dismissal of the alarm.

The CUSUM statistic for each node may be calculated by first calculating the "warped" inter-arrival time from a last received call (using parameters "r0" "r1", which may be looked up weekly, from a table, by the node multiplier), where the CUSUM scheme may then be implemented (as described above). Time-related outputs may be "unwarped," before being output to a network operator, or relayed to other routines.

Advantages

The example embodiments are believed to incur a number of advantages. For example, one application is to monitor and detect anomalies in calls made to a call center (occurrence of events). The example embodiments may be used to detect anomalous conditions which may cause customers to call the call center. For telecom operators, this may allow fast detection of issues which may be impacting customers, such as network and/or service issues. The network operator may then be able to proactively address these issues, thereby speeding resolution of problems that may be impacting multiple network users. This may result in improved customer satisfaction and reduced costs to the call center and field technicians. More generally, the example embodiments may be applicable to detecting anomalies in any type of received event streams, or occurrances, or counting processes.

The example embodiments may allow enhancement of existing binned counts-based algorithms for accommodating streaming scenario, so that the modified algorithm acts on each incoming event as it happens (e.g., as it is received). This may work naturally with streaming-based architecture, and may be computationally efficient, as no computation may be needed when there are no calls. Furthermore, the example embodiments may be used to enhance existing algorithms, in order to accommodate non-homogeneous arrival rates. These advantages may provide early detection of customer issues, and may provide a level of resiliency to expected natural fluctuations that may occur with call center calling rates.

Although depicted and described herein with respect to embodiments in which, for example, programs and logic are stored within the data storage and the memory is communicatively connected to the processor, it should be appreciated that such information may be stored in any other suitable manner (e.g., using any suitable number of memories, storages or databases); using any suitable arrangement of memories, storages or databases communicatively connected to any suitable arrangement of devices; storing information in any suitable combination of memory(s), storage(s) or internal or external database(s); or using any suitable number of accessible external memories, storages or databases. As such, the term data storage referred to herein is meant to encompass all suitable combinations of memory(s), storage(s), and database(s).

The description and drawings merely illustrate the principles of the example embodiments. It will thus be appreciated that those skilled in the art will be able to devise various arrangements that, although not explicitly described or shown herein, embody the principles of the invention and are included within its spirit and scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

The functions of the various elements shown in the example embodiments, including any functional blocks labeled as "processors," may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non-volatile storage. Other hardware, conventional or custom, may also be included.

Example embodiments having thus been described, it will be obvious that the same may be varied in many ways. Such variations are not to be regarded as a departure from the intended spirit and scope of example embodiments, and all such modifications as would be obvious to one skilled in the art are intended to be included within the scope of the following claims.

Example embodiments may be utilized in conjunction with various telecommunication networks and systems, such as the following (where this is only an example list): Universal Mobile Telecommunications System (UMTS); Global System for Mobile communications (GSM); Advance Mobile Phone Service (AMPS) system; the Narrowband AMPS system (NAMPS); the Total Access Communications System (TACS); the Personal Digital Cellular (PDC) system; the United States Digital Cellular (USDC) system; the code division multiple access (CDMA) system described in EIA/TIA IS-95; a High Rate Packet Data (HRPD) system, Worldwide Interoperability for Microwave Access (WiMAX); Ultra Mobile Broadband (UMB); and $3^{rd}$ Generation Partnership Project LTE (3GPP LTE).

What is claimed is:

1. A method of anomaly detection for a communication network, comprising:
   receiving, by at least one first processor of at least one first network node, a plurality of calls from users of the communication network, the plurality of calls having a non-homogenous arrival rate that is defined by first arrival rate information;
   transforming, by the at least one first processor, the first arrival rate information into second arrival rate information, the second arrival rate information having a homogenous arrival rate; and
   detecting, by the at least one first processor, at least one first anomaly of the received plurality of calls using the second arrival rate information.

2. The method of claim 1, wherein,
   the first arrival rate information is a non-homogenous Poisson process where the received plurality of calls are represented on non-constant time-scale, and
   the second arrival rate information is a homogenous Poisson process where the received plurality of calls are represented on constant time-scale.

3. The method of claim 1, wherein the transforming further includes,
   warping the first arrival rate information in order to represent the received plurality of calls on a stationary time-scale.

4. The method of claim 1, wherein the detecting further includes,
   identifying at least one first change in the second arrival rate information, the at least one first change being the at least one first anomaly.

5. The method of claim 1, wherein the detecting further includes,
   monitoring an initial set of calls, of the received plurality of calls, over a first period of time,
   calculating an average number of incoming calls based on the initial set of calls,
   determining a first set of cumulative sum (CUSUM) parameters for the at least one first network node, based on the initial set of calls and the average number of incoming calls,
   determining at least one first arrival rate threshold, based on the first set of CUSUM parameters.

6. The method of claim 1, wherein the detecting further includes,
   comparing the at least one first threshold to the second arrival rate information in order to detect the at least one first anomaly.

7. The method of claim 1, wherein the transforming and the detecting steps are performed each time a call, of the plurality of calls, is received.

8. The method of claim 7, wherein the transforming and the detecting steps are not performed at fixed time increments.

9. A network node, comprising:
   a memory storing computer readable instructions;
   at least one first processor configured to execute the computer readable instructions such that the at least one first processor is configured to,
   receive a plurality of calls from users of the communication network, the plurality of calls having a non-homogenous arrival rate that is defined by first arrival rate information;
      transform the first arrival rate information into second arrival rate information, the second arrival rate information having a homogenous arrival rate; and
      detect at least one first anomaly of the received plurality of calls using the second arrival rate information.

10. The network node of claim 9, wherein,
    the first arrival rate information is a non-homogenous Poisson process where the received plurality of calls are represented on non-constant time-scale, and
    the second arrival rate information is a homogenous Poisson process where the received plurality of calls are represented on constant time-scale.

11. The network node of claim 9, wherein the at least one first processor performs the transforming by being configured to,
    warp the first arrival rate information in order to represent the received plurality of calls on a stationary time-scale.

12. The network node of claim 9, wherein the at least one first processor performs the detecting by being configured to,
    identify at least one first change in the second arrival rate information, the at least one first change being the at least one first anomaly.

13. The network node of claim 9, wherein the at least one first processor further performs the detecting by being configured to,
    monitor an initial set of calls, of the received plurality of calls, over a first period of time,
    calculate an average number of incoming calls based on the initial set of calls,
    determine a first set of cumulative sum (CUSUM) parameters for the at least one first network node, based on the initial set of calls and the average number of incoming calls,
    determine at least one first arrival rate threshold, based on the first set of CUSUM parameters.

14. The network node of claim 9, wherein the at least one first processor is further configured to detect by being configured to,
    compare the at least one first threshold to the second arrival rate information in order to detect the at least one first anomaly.

15. The network node of claim 9, wherein the at least one first processor is further configured to perform the transforming and detecting each time a call, of the plurality of calls, is received.

16. The network node of claim 15, wherein the at least one first processor is further configured to perform the transforming and the detecting steps without the steps being performed at fixed time increments.

* * * * *